E. F. GALLAUDET.
AEROPLANE.
APPLICATION FILED SEPT. 12, 1911.
1,219,285.
Patented Mar. 13, 1917.
2 SHEETS—SHEET 2.
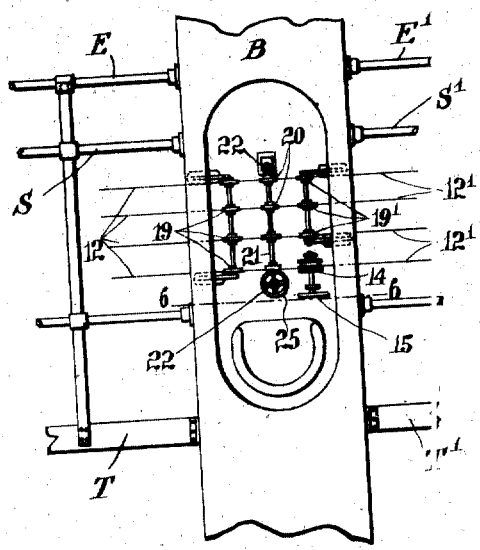
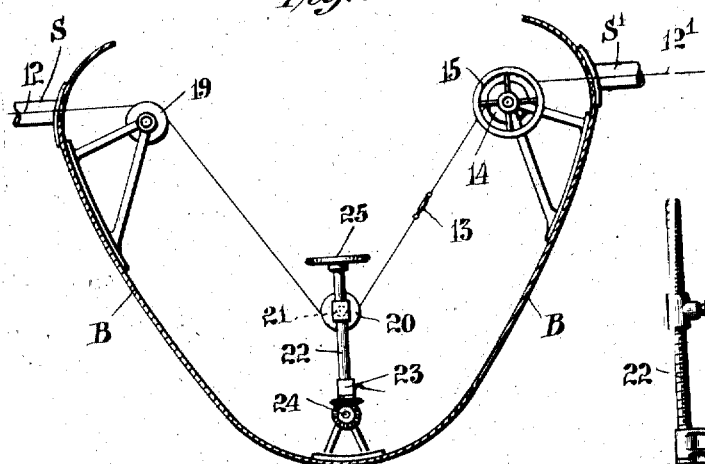
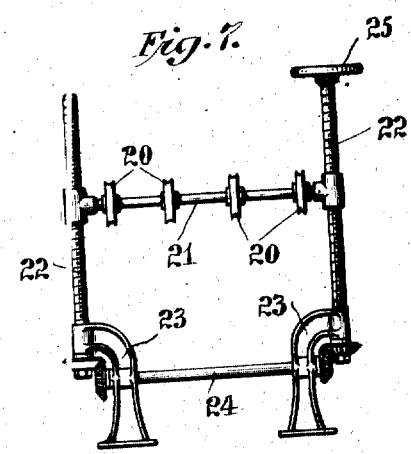

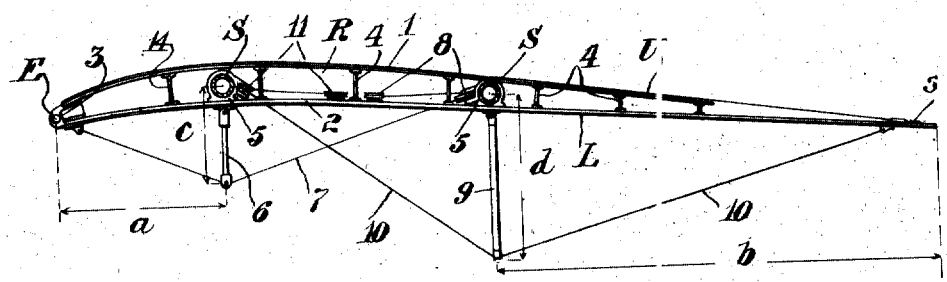
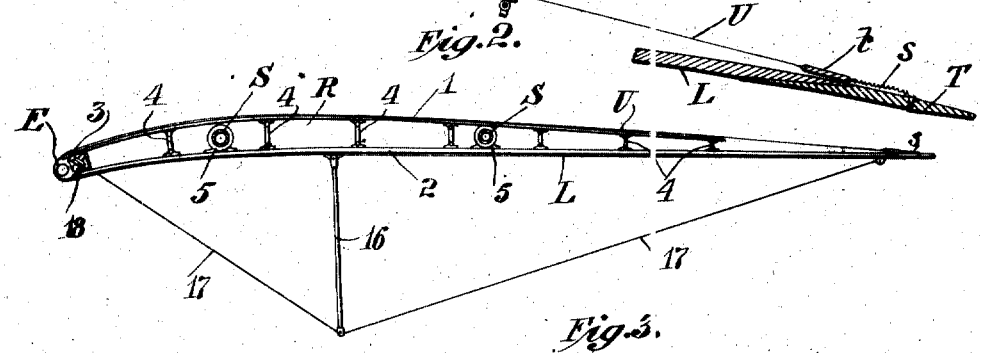
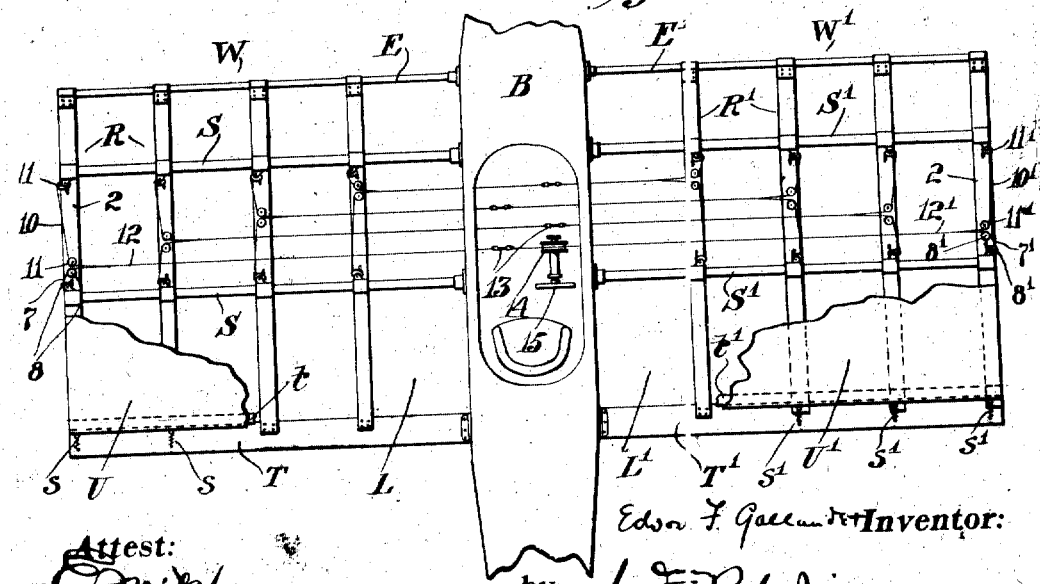

UNITED STATES PATENT OFFICE.

EDSON F. GALLAUDET, OF NORWICH, CONNECTICUT.

AEROPLANE.

1,219,285.                     Specification of Letters Patent.      Patented Mar. 13, 1917.

Application filed September 12, 1911. Serial No. 848,847.

*To all whom it may concern:*

Be it known that I, EDSON F. GALLAUDET, a citizen of the United States, and resident of the city of Norwich, in the county of New London and State of Connecticut, have invented a certain new and useful Aeroplane, of which the following is a specification.

My present invention relates to flying-machines of the aeroplane type, and more particularly to the construction of the planes or wing surfaces by means of which such machines are raised and sustained in the air.

One object of the invention is to provide an aeroplane with flexible curved wing surfaces the curvature of which can readily be adjusted as desired and as so adjusted can be increased or decreased at will to adapt the machine to different speeds; and a second object is to provide such a machine with oppositely extending wing surfaces so constructed and operatively connected that any change in the degree of curvature of the wing on one side, effected either automatically by the air-pressure thereon or by act of the operator, will simultaneously produce a corresponding but reverse change in the degree of curvature of the wing on the opposite side of the machine, thereby increasing the stability of the aeroplane by providing means for automatically equalizing the effects of unbalanced air-pressures upon the opposite sides thereof.

With these objects in view, one feature of my invention consists in the novel construction of flexible fore and aft ribs, which constitute a part of the usual frame of the wings. Another feature consists in the provision of means by which the curvature of such ribs and consequently of the wing surfaces can be adjusted as desired so that the wing surfaces may conform substantially to the stream lines of the air in its motion relative thereto. Still another feature consists in so connecting together the flexible ribs of the wings, a rib in one wing with the corresponding rib in the opposite wing, that an excessive pressure of the air upon one side of the aeroplane may flatten out the wing surface on that side and the decrease in its camber thus produced will cause a corresponding and symmetrical increase in the camber of the ribs and consequently of the surface of the opposite wing. A further feature consists in providing operative means and connections whereby the operator may at will either increase or decrease the camber of both wing surfaces whenever changes in speed or other conditions may render such changes desirable or cause or control the differential changes in the camber of the opposite wing surfaces and thereby assume active control of the lateral balance of the aeroplane. The invention also comprises certain other novel features of construction, arrangement, and combination of parts hereinafter described and particularly pointed out in the appended claims.

In the accompanying drawings, wherein there is illustrated certain specific embodiments of my invention, Figure 1 is a fore to aft section of a wing, showing in side elevation one of the flexible ribs with which its frame is provided; Fig. 2, a similar view, showing a slightly modified arrangement of the means by which the camber of the ribs is obtained; Fig. 3, a plan of the wings as arranged in connection with the body of a common monoplane type of flying-machine, with the greater part of the upper surface fabric and rib structure cut away, showing diagrammatically the connections and operative means for effecting differential changes in the camber of the oppositely extending wings; Fig. 4, a sectional detail, showing on an enlarged scale the construction at the rear edge of the wings; Fig. 5, a plan similar to that of the central portion of Fig. 3, showing the addition of means for effecting at will like changes in the camber of the two wings; Fig. 6, an enlarged section on the line 6 6 of Fig. 5, looking toward the front of the machine; and Fig. 7, a side elevation of a part of the camber changing means shown in Figs. 5 and 6.

Referring to the drawings, each of the ribs R, which are alike in construction and constitute the principal feature of the frame of the two oppositely extending wings W W' of the monoplane shown, comprises an upper flexible batten 1 and relatively stiff lower batten 2, both of suitable light resilient material, which at their front ends are secured to a nose-piece 3 and are held properly spaced apart by a series of spacer-links 4 pivoted at each end to lugs on the inner sides of the battens. As here shown, the upper batten terminates at its rear end immediately behind the last of the pivoted spacer-links, but it may equally well extend back and be secured to the rear end of the lower batten by any suitable sliding connection which will permit the necessary longitudinal movement between it and the lower batten at this end.

For the wing W, a series of the flexible trussed ribs F, thus constructed, are mounted upon two main wing spars S S, which are attached at their inner ends to the body B of the machine, by means of suitable bearings 5 secured to the lower batten of each rib. The ribs are connected together and held in proper position at their front ends by a more or less flexible bar or tube E which passes through an opening in the nose-piece of each rib and is secured at its inner end to the body of the machine, forming the front or entering edge of the wing. At their rear ends, the lower battens of the ribs are suitably secured to a flexible slat T which is also attached at its inner end to the side of the body and constitutes the rear or trailing edge of the wing. The frame-work thus formed is covered in the usual manner with any suitable lower surface fabric L and with an upper surface fabric U which at its rear edge is secured to a slat which in turn is yieldingly secured to the rear edge slat T by springs $s$, thus at all times maintaining the upper surface fabric taut while permitting it to yield as required whenever the camber of the wing is increased. The wing W' is similarly formed, on the other side of the body of the machine, by a corresponding series of ribs R' which, mounted in like manner upon the main wing spars S' S' and connected together at their front ends by the tube E' and at their rear ends by the slat T', are covered with lower surface fabric L' and upper surface fabric U'.

The camber of the ribs and consequently the curvature of the wing surfaces is obtained and maintained, as shown in Figs. 1 and 3, by means of truss-wires 7 and 10, the wire 7 attached at one end to the front end of the lower batten and passing over the end of the pivoted queen-post 6 and around guide-sheaves 8 and the wire 10 attached at one end to the rear end of the lower batten and then passing over the pivoted queen-post 9 and around the guide-sheaves 11, which are united in a single wire 12 connected by turnbuckle 13 with wire 12' by which the truss-wires 7 and 10 of each rib R are symmetrically connected with similar truss-wires 7' and 10' of the corresponding ribs R' of the opposite wing. The turnbuckles 13 afford a convenient means for shortening and lengthening the wires 12 12' and thereby adjusting the mean camber of each pair of ribs symmetrically located one in one and the other in the opposite wing. By providing similar or other suitable means for adjusting the length of the truss-wires 7 and 10 and 7' and 10' or by making the queen-posts adjustable in length, the curvature both of the front and rear portions of the wings and the angles of their entering and trailing edges, as well as the chord angles of the wings, can be changed as required for more closely conforming the surfaces of the wings to the stream line produced by their motion through the air. It is also apparent that, by reason of the interconnection between the corresponding ribs of the opposite wings, an excessive wind pressure on the under surface of one wing, W for example, will tend to flatten the curvature of that wing surface, particularly at its outer end, and in so doing will draw upon the wires 12 12' and thereby symmetrically increase the curvature of the wing W', thus automatically equalizing the effects of unbalanced air-pressures upon the opposite sides of the machine; and further, that where, as here shown, the queen-posts 6 and 9 are of such length and are so placed that the value of $\frac{c}{a}$ equals that of $\frac{d}{b}$ the chord angle of the two wings will remain constant and differential changes in their lift will be produced by changes of curvature only, since in all changes of curvature the ends of the queen-posts on each of the two corresponding ribs of the opposite wings will be moved toward or from each other through equal arcs and both front and rear ends of each pair of ribs will rise or be drawn down the same vertical distance.

One of the wires 12 12', preferably that connecting the truss-wires of the outer rib of each wing as shown, is passed around a drum 14 fixed upon a shaft which is mounted to rotate in bearings suitably secured to the body or main frame of the machine and is provided with a hand-wheel 15 conveniently located with reference to the operator's seat. The drum and wheel, rotating freely, do not interfere with the automatic action by which changes in the relative curvature of the two wings are effected as above described by differences in the air-pressures thereon, while at the same time they afford means by which the operator can at any time either assume control of such automatic action or actively interfere to produce such differential changes of wing curvature as may be desired.

In the modification shown in Fig. 2, a single truss-wire 17 is attached at one end to the rear end of the lower batten of each rib R and, after passing over the end of a pivoted queen-post 16 and around a guide-sheave 18 secured to the nose-piece of the rib, is adjustably connected as before to a similarly arranged truss-wire upon the corresponding rib of the opposite wing, the connecting wire between one pair of ribs being passed around a freely rotating drum in the manner and for the purpose previously described. In this case, however, increases in the curvature will be accompanied by increases in the chord angle of the wing, and vice versa, and consequently the changes in the relative lift of the two opposite wings due to the differential changes in their curvature will be accentuated by corresponding changes in their chord angle.

In Figs. 5, 6, and 7 each of the connecting wires 12 12', instead of passing straight across the cock-pit formed in the body of the machine as in Fig. 3, is carried over guide-sheaves 19 and 19', except as the drum 14 with its hand-wheel 15 already described replaces the guide-sheave 19' in case of the wire connecting the outer rib of the two wings, and down under an intermediate sheave 20. The guide-sheaves 19 are mounted to rotate independently upon a shaft suitably secured on one side of the body near the upper edge of the cock-pit, and the guide-sheaves 19' are similarly mounted upon the opposite side of the body. The sheaves 20 rotate independently and are vertically adjustable, being mounted to turn upon a shaft 21 which is supported at its ends by T-nuts through which are screwed respectively right and left threaded vertical posts 22 rotatably mounted in suitable supports 23 in the bottom of the cock-pit and operatively connected by means of the shaft 24 journaled in the same supports and geared at its ends to the lever ends of the posts. A hand-wheel 25 is fixed to the upper end of the rear threaded post, within convenient reach from the operator's seat. It is evident that when the hand-wheel is turned in one direction the adjustable sheaves will be forced downwardly, thereby tightening the wires 12 12' and increasing the camber of the ribs of both wings, and that when the hand-wheel is turned in the opposite direction the sheaves will rise so as to let out the wires and allow the ribs to straighten out to the extent permitted. Other means for raising and lowering the adjustable sheaves may of course be substituted for those here described and may be made operative either by the hand or foot of the operator. This addition, while it does not interfere with the movement of the connecting wires by which the differential changes in the camber of the two wings is effected as hereinbefore described, enables the operator, for the first time so far as I am aware, to change the curvature and consequently the lift of the wings at will during flight to adapt them to changing conditions and particularly to changes in speed, a smaller curvature with less lift for high speed and vice versa.

It is to be noted that a change in the chord angle of a wing constructed according to my invention is a very different thing from what has heretofore been known as a change in the angle of incidence. In the well known types of flying-machines the wing ribs employed are rigid in themselves, whether the wing as a whole can be warped or not. Thus, whenever a part of a wing is warped or the entire wing is tilted up to a greater positive angle to increase its lifting power, each individual rib necessarily turns in all its parts through the same angle, and consequently there is no possibility of distinction between changes in its chord angle and changes in its angle of incidence since every change in one angle is always accompanied by a like change in the other. When, however, it is desired to increase the lifting power of my flexible wing, the necessary increase in its curvature is accompanied by different changes in angle at all points on the ribs from front to rear and there is an increase in the downward angle of the front entering edge as well as in that of the rear trailing edge of the wings; consequently, the chord angle of the wing cannot properly be considered as in any way related to any angle of incidence. It is in fact one of the chief purposes of my invention to eliminate the angle of incidence entirely, and to impart to the wings a fore and aft contour which shall follow as closely as possible the stream lines produced in the motion of the air relative to the wings by the actual motion of the wings through the air. It is a well known fact that in passing through the air a backwardly inclined wing forces the air downward and forward and that the forward motion thus imparted produces an upward current of air which impinges upon the lower side of the wing at and near its front edge; and it is now very generally understood that to avoid air shocks at its entering edge, the front of a properly curved wing must turn down slightly. To increase the lifting power of the wing its rear edge must be depressed, but, if air shocks accompanied by loss of efficiency are to be avoided, the front edge must also be depressed so that the wing contour may conform to the new stream lines produced in the air. This I have accomplished by my invention.

While I have hereinbefore specifically described my invention and its several features only with reference to the particular embodiments thereof which are illustrated in the drawings, it will be understood that the invention is in principle equally applicable to wing surfaces which, as in the common biplane type of flying-machine, extend integrally from one side to the other of the machine, and, further, that it can be variously modified in its various details, within the scope of the appended claims, without departing from the spirit or sacrificing the advantages thereof.

What I claim as new, and desire to secure by Letters Patent, is—

1. In a flying machine, the combination with a wing structure flexible fore and aft as an entirety and yieldingly held in cambered position of means for changing the camber without changing the chord angle of the structure.

2. In a flying machine, the combination with flexible wing surfaces of means for yieldingly maintaining a camber therein in such manner that changes in their fore and aft curvature will be accompanied by similar changes in the angular position both of their front and rear edges and changes in the curvature of the wing surface on one side will produce symmetrical but reverse changes in the curvature of the wing surface on the other side of the machine.

3. In a flying machine, the combination with a wing structure comprising fore and aft ribs adapted to flex both at their front and rear ends of means for maintaining a camber of the ribs and so connecting together the corresponding ribs on opposite sides of the longitudinal axis of the machine with the flattening of the ribs and wing surface on one side of the machine caused by increase of wind pressure thereon will produce a symmetrical increase in curvature of the corresponding ribs and the wing surface on the other side until the increase in wing load due to such increased curvature equals the increase of wing load due to increased wind pressure.

4. In a flying machine, the combination with a wing structure comprising flexible ribs and means for maintaining a variable camber therein of connecting means whereby changes in the curvature of a rib on one side will automatically produce equal and reverse changes in the curvature of the corresponding rib on the other side of the machine and means whereby the operator may cause or prevent such differential changes in the curvature of the ribs on opposite sides of the machine.

5. In a flying-machine, a wing structure comprising as elements thereof a series of flexible ribs, truss-wires adapted to maintain a camber of the ribs, and adjustable connections between the truss-wires of the ribs on one side of the longitudinal center of the wing with ribs symmetrically located on the other side of the longitudinal center of the wing whereby any changes in the camber of a rib on one side will cause equal but reverse changes in the camber of the corresponding rib on the other side.

6. In a flying-machine, the combination with a wing structure comprising a series of flexible trussed ribs symmetrically arranged on opposite sides of its longitudinal center of truss-wires each of which is attached at one end to an end of a rib and after passing over a guide-sheave mounted upon the rib at a point removed from the end to which the truss-wire is attached is connected with the free end of the truss-wire similarly arranged upon the corresponding rib on the opposite side of the wing.

7. In a flying-machine, the combination with a wing structure comprising a series of flexible trussed ribs symmetrically arranged on opposite sides of its longitudinal center of truss-wires each of which is attached at one end to an end of a rib and after passing over a guide-sheave mounted upon the rib at a point removed from the end to which the truss-wire is attached is connected with the free end of the truss-wire similarly arranged upon the corresponding rib on the opposite side of the wing and means for adjusting the length of the connection between the truss-wires of each pair of connected ribs.

8. In a flying-machine, the combination with a wing structure comprising a series of flexible trussed ribs symmetrically arranged on opposite sides of its longitudinal center of truss-wires each of which is attached at one end to an end of a rib and after passing over a guide-sheave mounted upon the rib at a point removed from the end to which the truss-wire is attached is connected with the free end of the truss-wire similarly arranged upon the corresponding rib on the opposite side of the wing and a sheave which is mounted upon to rotate with a shaft carrying a hand-wheel and around which is wound the connection between at least one pair of oppositely located ribs.

9. In a flying machine, the combination with a wing structure comprising a series of flexible ribs symmetrically arranged on opposite sides of its longitudinal axis and truss wires adapted to maintain a variable camber of the ribs, of means within the control of the operator whereby he may vary the tension of the truss wires to simultaneously effect like changes in the camber of the ribs and thereby of the entire wing structure on both sides of the machine.

10. In a flying machine, the combination with a wing structure comprising a series of flexible cambered ribs symmetrically arranged on opposite sides of its longitudinal axis of means whereby changes in the curvature of the ribs on one side will produce symmetrical but reverse changes in the curvature of corresponding ribs on the other side of the machine and means whereby the operator may simultaneously produce like changes in the curvature of the ribs on both sides of the machine.

11. In a flying machine, a wing structure comprising a series of ribs which are flexible throughout their length and are connected together at their front and rear ends to form a wing frame, truss-wires adapted to maintain a variable camber of the ribs by flexing both their front and rear ends, and upper and lower surface fabrics the rear edge of the upper surface fabric being yieldingly secured to the rear edge of the wing frame.

12. In a flying machine, the combination with a flexible cambered wing structure comprising a series of flexible ribs supported intermediate their ends forward of their longitudinal centers and covered above and below with suitable surface coverings of means for depressing and raising both the front and rear ends of the ribs equally to change the curvature without changing the chord angle of the wing structure.

13. In a flying machine, the combination with flexible wing surfaces comprising a series of flexible ribs supported intermediate their ends forward of their longitudinal centers and covered above and below with suitable surface coverings of means for maintaining a camber of said surfaces which is automatically variable under variations in the air pressure thereon without change in the chord angle of the surfaces and means within the control of the operator for changing the camber also without change in the chord angle to adjust the curvature of said surfaces to the stream lines of the air in its motion relative thereto.

14. In a flying machine, the combination with flexible cambered wing surfaces adapted to change of curvature without change of chord angle of means actuated by the flattening of the curvature of the wing surface on one side for producing an increase in the curvature of the wing surface on the opposite side of the machine.

15. In a flying machine, the combination with curved wing surfaces adapted to be flexed to varying degrees of curvature with similar changes in the angular position of both their front and rear edges of means actuated by a change in the curvature of the wing surface on one side for producing a symmetrical but reverse change in the curvature of the wing surface on the opposite side of the machine.

16. In a flying machine, the combination with curved wing surfaces adapted to be flexed to varying degrees of curvature with similar changes in the angular position of both their front and rear edges of means actuated by a change in the curvature of the wing surface on one side for producing a symmetrical but reverse change in the curvature of the wing surface on the opposite side of the machine and means for similarly changing the curvature of the wing surfaces on both sides of the machine.

17. A wing structure for flying machines which includes as an element thereof a rib comprising flexible upper and lower battens both of which, secured together at their front ends, extend integrally through substantially the entire length of the rib and are suitably spaced apart by a series of pivoted spacer links.

18. A wing structure for flying machines which includes as elements thereof a series of flexible trussed ribs, each comprising an upper and lower batten which extend integrally through substantially the entire length of the rib and are secured together rigidly at their front ends and yieldingly at their rear ends so as to permit of the longitudinal movement of one with respect to the other and intermediate their ends are held suitably spaced apart by pivoted spacer links, a front edge piece connecting together the front ends of the ribs, and a rear edge piece connecting together the rear ends of the lower battens of the ribs.

19. A wing structure for flying-machines which includes as elements a series of flexible trussed ribs each comprising an upper and lower batten secured together at their front ends and held suitably spaced apart by pivoted spacer-links and means, including a queen-post mounted upon the lower batten and a truss-wire attached at one end to the rear end of the lower batten and passing over the queen-post, whereby the operator may control the degree of camber of the ribs during flight.

20. A wing structure for flying-machines which includes as elements a series of flexible trussed ribs symmetrically arranged on the opposite sides thereof and each comprising an upper and lower batten secured together at their front ends and held suitably spaced apart by pivoted spacer-links, lower and upper surface fabrics the latter yieldingly secured along the rear edge of the wing, and means comprising queen-posts and truss-wires and connections between the truss-wires of ribs correspondingly located on opposite sides of the wing whereby a suitable camber of the ribs is maintained and any force acting to decrease the camber of the ribs on one side will produce a corresponding and symmetrical increase in the camber of the ribs on the opposite side of the wing.

21. In a flying-machine, the combination with a wing structure which includes as elements a series of flexible ribs symmetrically arranged on opposite sides of the machine and is provided with means including truss-wires and connections between the truss-wires of ribs correspondingly located on opposite sides of the machine whereby a camber of the ribs is maintained and any force acting to decrease the camber of the ribs on one side will produce a corresponding and symmetrical increase in the camber of the ribs on the opposite side of the machine of means including adjustable sheaves acting upon the said connections between the truss-wires of oppositely located ribs whereby the operator may simultaneously increase or decrease the camber of the ribs on both sides of the machine.

22. In a flying machine, a distortable aerofoil, and a means to maintain the angle of incidence of the aerofoil unaltered during distortion.

23. In a flying machine, a distortable element having an air reaction surface and means to retain the angle of incidence of said element unaltered during distortion.

EDSON F. GALLAUDET.

In presence of—
JOHN KUKLA,
HERMAN ALOFSIN, 2nd.